US012392455B2

(12) United States Patent
Dietze, Jr. et al.

(10) Patent No.: US 12,392,455 B2
(45) Date of Patent: Aug. 19, 2025

(54) SYSTEM FOR TRANSPORTING NON-NEWTONIAN MATERIALS USING ACOUSTIC SOFTENING OVER LONG DISTANCES

(71) Applicant: GM GLOBAL TECHNOLOGY OPERATIONS LLC, Detroit, MI (US)

(72) Inventors: Robert H. Dietze, Jr., Brighton, MI (US); Christopher Brady, Madison Heights, MI (US); Dmitriy Bruder, Clinton Township, MI (US); Megan E. McGovern, Detroit, MI (US); Robin James, Rochester Hills, MI (US); Ryan Gergely, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 230 days.

(21) Appl. No.: 18/134,664

(22) Filed: Apr. 14, 2023

(65) Prior Publication Data

US 2024/0344668 A1 Oct. 17, 2024

(51) Int. Cl.
*F17D 1/14* (2006.01)

(52) U.S. Cl.
CPC .................................... *F17D 1/14* (2013.01)

(58) Field of Classification Search
CPC ........................................ F17D 1/14
USPC ........................................ 137/828
See application file for complete search history.

(56) References Cited

U.S. PATENT DOCUMENTS 3,649,358 A * 3/1972 Johnson, II .............. B01J 19/10 118/259
3,746,027 A * 7/1973 Elliott ..................... F17D 1/14 137/268
4,941,346 A 7/1990 Suzuki et al.
5,690,145 A * 11/1997 Kuklinski ................ F15C 1/04 181/0.5
5,797,414 A * 8/1998 Sirovich ................ F15D 1/003 137/833

(Continued)

FOREIGN PATENT DOCUMENTS

DE 19813975 A1 9/1999
JP 2004012149 A 1/2004
KR 20140050438 A * 4/2014 ............. F16L 3/205

OTHER PUBLICATIONS

Translation of KR 201440050438 (Year: 2014).*

(Continued)

*Primary Examiner* — Umashankar Venkatesan

(57) ABSTRACT

A system for transporting a non-Newtonian material. The system includes a storage container configured to store the non-Newtonian material and a dispensing system configured to dispense the non-Newtonian material. A conduit connects the storage container to the dispensing system. The conduit is configured to transport the non-Newtonian material from the storage container to the dispensing system. A pump is configured to pump the non-Newtonian material out of the storage container and through the conduit to the dispensing system. A hanger is configured to support the conduit from a support structure. An acoustic wave generator is along the conduit configured to impart acoustical shear agitation to the non-Newtonian material to reduce viscosity of the non-Newtonian material.

15 Claims, 4 Drawing Sheets

(56) References Cited

U.S. PATENT DOCUMENTS

| | | | | | |
|---|---|---|---|---|---|
| 5,884,650 | A * | 3/1999 | Ruffa | F16L 57/00 | |
| | | | | 137/13 | |
| 6,026,839 | A * | 2/2000 | Kriebel | F16L 53/32 | |
| | | | | 137/340 | |
| 8,396,676 | B2 | 3/2013 | Zozulya et al. | | |
| 11,358,328 | B2 * | 6/2022 | Okonski | B29C 64/165 | |
| 11,740,206 | B2 * | 8/2023 | Giurgiutiu | G01N 29/0645 | |
| | | | | 73/596 | |
| 11,982,660 | B2 * | 5/2024 | Ardanese | G01N 33/0036 | |
| 12,098,990 | B2 | 9/2024 | Jhe et al. | | |
| 2007/0084272 | A1 | 4/2007 | Wang | | |
| 2015/0052981 | A1 * | 2/2015 | Kim | G01N 29/032 | |
| | | | | 73/54.41 | |
| 2020/0166444 | A1 * | 5/2020 | Anklin | G01N 11/16 | |
| 2023/0364633 | A1 | 11/2023 | Dietz, Jr. et al. | | |
| 2024/0344668 | A1 | 10/2024 | Dietze, Jr. et al. | | |

OTHER PUBLICATIONS

Material Safety Sheet for EA 1800EV A; Revision No. 001.0; Issue date: Nov. 3, 2020; 5 Pages.

Material Safety Sheet for EA 1800EV B; Revision No. 001.0; Issue date: Nov. 3, 2020; 5 Pages.

Safety Data Sheet according to (EC) No. 1907/2006 as amended for Loctite TLB 9200 APS Part A. Revision: Jun. 24, 2021; 9 Pages.

Safety Data Sheet according to (EC) No. 1907/2006 as amended for Loctite TLB 9200 APS Part B. Revision: Jun. 24, 2021; 16 Pages.

U.S. Appl. No. 17/743,199, filed May 12, 2022, Robert H. Dietze.

U.S. Appl. No. 18/084,091, filed Dec. 19, 2022, Dmitriy Bruder.

* cited by examiner

SYSTEM FOR TRANSPORTING NON-NEWTONIAN MATERIALS USING ACOUSTIC SOFTENING OVER LONG DISTANCES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a system for transporting non-Newtonian materials using acoustic softening over long distances.

Non-Newtonian materials do not follow Newton's law of viscosity, that is, they have a variable viscosity dependent on the amount of shear stress that the material is subject to. Shear thinning non-Newtonian materials decrease in viscosity when subject to increased shear stress. Shear thinning non-Newtonian materials are used in various manufacturing processes. For example, electric vehicle battery packs include shear thinning non-Newtonian thermal interface materials, potting materials, and adhesives.

SUMMARY

The present disclosure includes, in various features, a system for transporting a non-Newtonian material. The system has a storage container configured to store the non-Newtonian material. A dispensing system is configured to dispense the non-Newtonian material. A conduit connects the storage container to the dispensing system. The conduit is configured to transport the non-Newtonian material from the storage container to the dispensing system. A pump is configured to pump the non-Newtonian material out of the storage container and through the conduit to the dispensing system. A hanger is configured to support the conduit from a support structure. An acoustic wave generator is along the conduit configured to impart acoustical shear agitation to the non-Newtonian material to reduce viscosity of the non-Newtonian material.

In further features, the acoustic wave generator includes a plurality of acoustic transducers arranged around the conduit.

In further features, the plurality of acoustic transducers include shear polarized acoustic transducers configured to introduce shear acoustic waves in a direction parallel to a longitudinal axis of the conduit.

In further features, the plurality of acoustic transducers are on an exterior of the conduit.

In further features, the plurality of acoustic transducers are on an interior of the conduit.

In further features, the plurality of acoustic transducers include rotary transducers and translatory transducers.

In further features, the plurality of acoustic transducers are at an expansion joint of the conduit.

In further features, the acoustic wave generator includes an acoustic shaker.

In further features, the acoustic shaker is at an exterior of an expansion joint of the conduit.

In further features, the conduit includes a concentric pipe; and the acoustic wave generator includes outer acoustic transducers at an outer diameter of the concentric pipe and inner acoustic transducers at an inner diameter of the concentric pipe.

In further features, the outer acoustic transducers are aligned with the inner acoustic transducers.

In further features, the outer acoustic transducers are offset from the inner acoustic transducers.

In further features, a heater is proximate to the acoustic wave generator, the heater configured to heat the non-Newtonian material.

In further features, the acoustic wave generator includes a plurality of internal piezoelectric patch transducers at an interior of the conduit.

In further features, the acoustic wave generator includes a piezoelectric film transducer at an interior of the conduit.

In further features, the hanger is configured to support the conduit from the support structure including a building truss.

In further features, the hanger includes dampeners configured to isolate vibration of the conduit from the support structure.

In various features, the present disclosure includes a system for transporting a non-Newtonian material. The system has a storage container configured to store the non-Newtonian material. A dispensing system is configured to dispense the non-Newtonian material. A conduit connects the storage container to the dispensing system, the conduit configured to transport the non-Newtonian material from the storage container to the dispensing system. A transfer chamber is along the conduit between the storage container and the dispensing system. A first pump is configured to pump the non-Newtonian material out of the storage container and into the transfer chamber. A second pump is configured to pump the non-Newtonian material out of the transfer chamber to the dispensing system. A pressure source is at the transfer chamber configured to apply pressure to the non-Newtonian material within the transfer chamber. A plurality of acoustic transducers are along the conduit configured to impart acoustical shear agitation to the non-Newtonian material to reduce viscosity of the non-Newtonian material.

In further features, the plurality of acoustic transducers include shear polarized acoustic transducers configured to introduce shear acoustic waves in a direction parallel to a longitudinal axis of the conduit.

In various features, the present disclosure includes a system for transporting a non-Newtonian material. The system has a storage container configured to store the non-Newtonian material. A dispensing system is configured to dispense the non-Newtonian material. A conduit connects the storage container to the dispensing system. The conduit is configured to transport the non-Newtonian material from the storage container to the dispensing system. A pump is configured to pump the non-Newtonian material out of the storage container and through the conduit to the dispensing system. A plurality of shear polarized acoustic transducers about the conduit are configured to introduce shear acoustic waves in a direction parallel to a longitudinal axis of the conduit to reduce viscosity of the non-Newtonian material.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
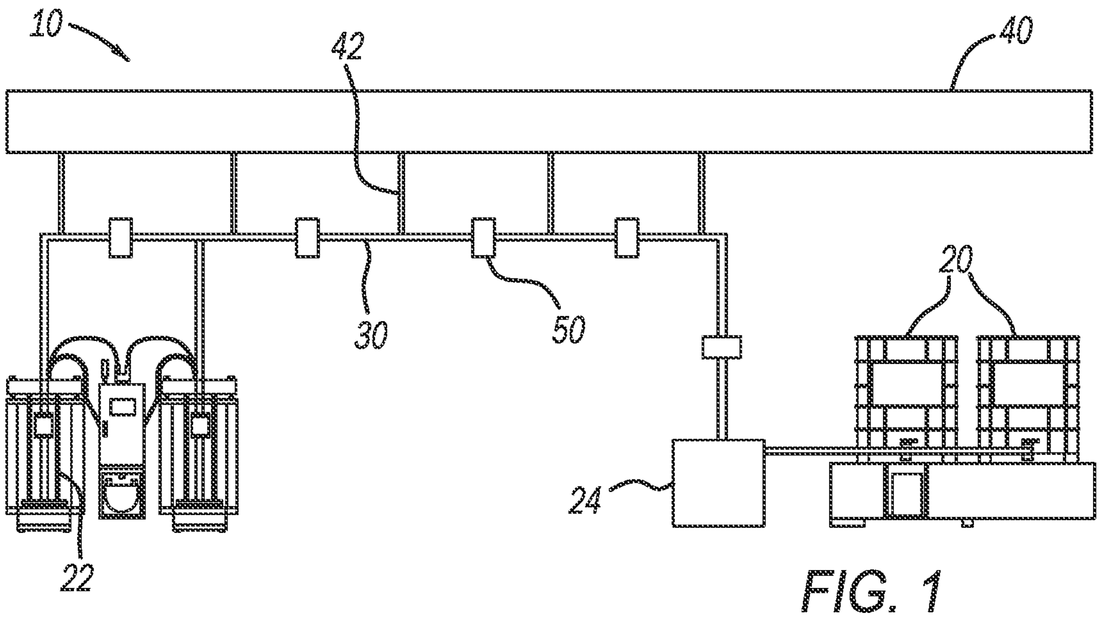
FIG. 1 illustrates an exemplary system in accordance with the present disclosure for transporting non-Newtonian material.

FIG. 1 illustrates an exemplary system 10 in accordance with the present disclosure for transporting any suitable non-Newtonian material from a storage container 20 to a dispensing system 22. Non-Newtonian materials do not follow Newton's law of viscosity. That is, non-Newtonian materials have a variable viscosity dependent on the amount of shear stress that the material is subject to. Shear thinning non-Newtonian materials decrease in viscosity when subject to increased shear stress. Exemplary shear thinning non-Newtonian materials that the system 10 is configured to transport from the storage container 20 to the dispensing system 22 include, for example, materials used in manufacturing battery packs for battery electric vehicles. Exemplary battery pack materials include, but are not limited to, thermal interface material (TIM), potting materials, and adhesives. The system 10 is configured to transport shear thinning non-Newtonian materials across large distances, such as across a large factory floor where battery packs are manufactured, assembled, and/or installed into battery electric vehicles. The system 10 may be configured for transporting non-Newtonian materials, or any other suitable materials, at any other suitable location as well.

The system 10 further includes a pump 24, which is configured to pump the non-Newtonian material from the storage containers 20 to the dispensing system 22 through any suitable conduit 30. The storage containers 20 may be any suitable storage containers at any suitable location at a manufacturing site. The dispensing system 22 may be any suitable dispensing system configured to dispense shear thinning non-Newtonian material, such as TIM, potting materials, adhesives, etc. The dispensing system 22 may be arranged any suitable distance from the storage containers 20, such as at opposite ends of a manufacturing shop floor.

The conduit 30 may be any suitable pipe, for example, of any suitable length to connect the storage containers 20 to the dispensing system 22. The conduit 30 may be hung from any suitable support structure 40 using hangers 42. The support structure 40 may be a building truss, for example. Thus, the conduit 30 may be suspended above a shop floor to allow personnel, forklifts, and other vehicles and machinery to pass under the conduit 30. The hangers 42 extend from the support structure 40 to the conduit 30, and may include dampeners configured to isolate vibrations at the conduit 30 from the support structure 40. The hangers 42 may include any suitable dampeners, such as, but not limited to, a tuned mass damper, a sheer thickening material damper, a rubber damper, etc.

Along the conduit 30 is any suitable number of acoustic wave generators 50 configure to impart acoustical shear agitation to the non-Newtonian material as the material passes through the conduit 30 to reduce the viscosity of the non-Newtonian material. Reducing the viscosity of the non-Newtonian material allows the material to more freely and rapidly flow from the storage container 20 to the dispensing system 22. As a result, the system 10 increases the volume of non-Newtonian material to the dispensing system 22 and increases the distance that the material may be transported from the storage container 20, which improves manufacturing times, reduces forklift traffic at the manufacturing site, reduces equipment footprint, eliminates manual drum exchange at a point of use, and allows for larger bulk material containers. The conduit 30 may include a low internal friction coating to further reduce the viscosity of the non-Newtonian material.

Figure 2A:
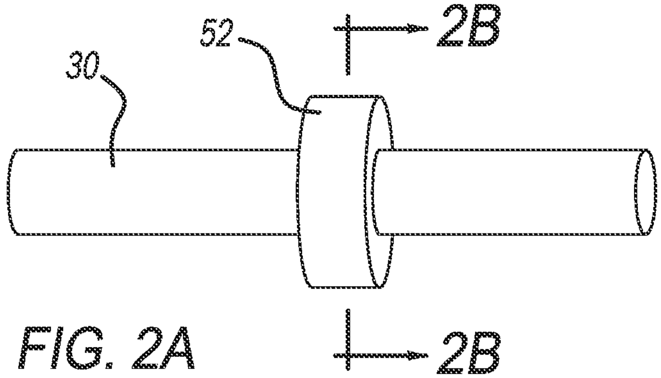
FIG. 2A illustrates a conduit of the system of FIG. 1 including an acoustic collar housing an exemplary acoustic wave generator in accordance with the present disclosure in the form of acoustic transducers.
Figure 2B:
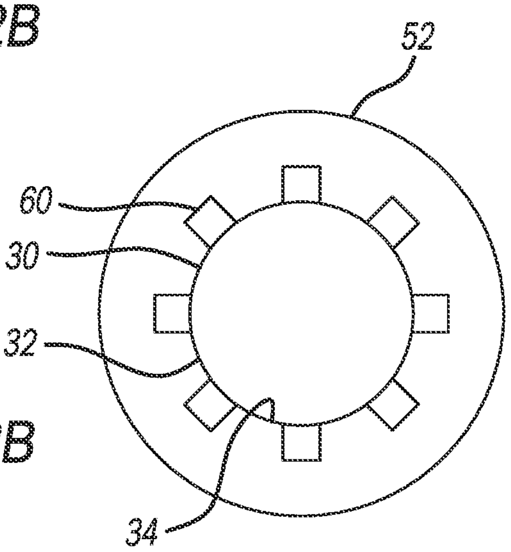
FIG. 2B is a cross-sectional view taken along line 2B-2B of FIG. 2A.

With reference to FIGS. 2A and 2B, the acoustic wave generator 50 may include a plurality of acoustic transducers 60 within an acoustic collar 52. In the example illustrated, the acoustic transducers 60 are secured at an exterior surface 32 of the conduit 30, which is opposite to an interior surface 34 of the conduit 30. The acoustic transducers 60 are spaced apart about the exterior surface 32 of the conduit 30. Any suitable number of acoustic transducers 60 may be arranged along the length of the conduit 30. The acoustic transducers 60 may be any suitable transducers configured to convert electromagnetic energy into acoustic energy. For example, the transducers 60 may include shear polarized acoustic transducers configured to introduce shear acoustic waves in a direction parallel to a longitudinal axis of the conduit 30. Activation of the acoustic transducers 60 agitates the shear thinning non-Newtonian material, thereby reducing the viscosity of material to facilitate flow of the material through the conduit 30.

Guided waves arise when the acoustic wave interacts with the geometric boundaries of the conduit 30 or other structure through which it is propagating. For a given geometry, multiple guided wave modes are generated. Which modes are present is characterized by the dispersion curve and depends on the frequency of the acoustic wave. All modes will exist simultaneously; however, it is possible to "funnel" more energy into a desired mode by selecting a transducer that outputs a given displacement profile/frequency conducive to the wave-mode of choice. For example, out of phase shear transducers positioned along the conduit 30 will be conducive to a torsional mode. For shear thinning applications in pipes, it is most desirable to generate a mode which has a high displacement profile at the inner diameter of the pipe. The acoustic transducers 60 may be configured to generate any suitable guided wave to maximize shear at an inner diameter of the conduit 30, such as a longitudinal mode, flexural mode, or a torsional mode.

Figure 3:
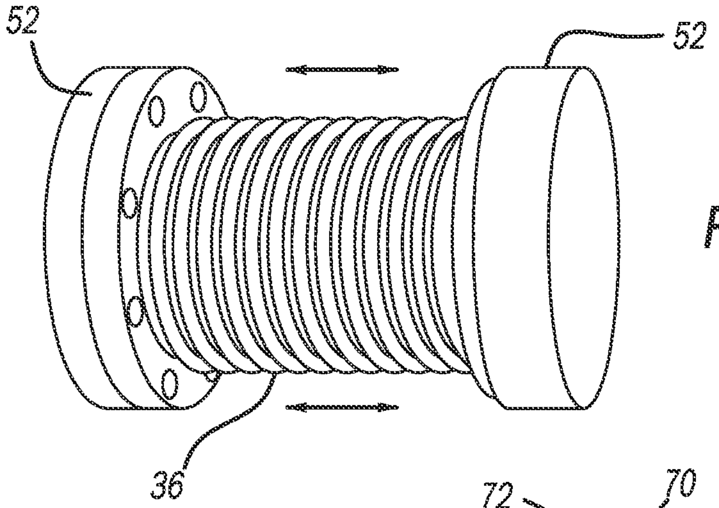
FIG. 3 is a perspective view of an expansion joint of the conduit of FIG. 1 including acoustic collars housing exemplary acoustic wave generators in the form of acoustic transducers.

With reference to FIG. 3, acoustic collars 52 including any suitable acoustic wave generator 50, such as the acoustic transducer 60, may be arranged on opposite ends of an expansion joint 36 of the conduit 30. The expansion joint 36 is configured to allow the conduit 30 to expand and contract, thereby facilitating acoustic transfer across the conduit 30 and lessening stress on the conduit 30 from the acoustic wave generators 50.

Figure 4:
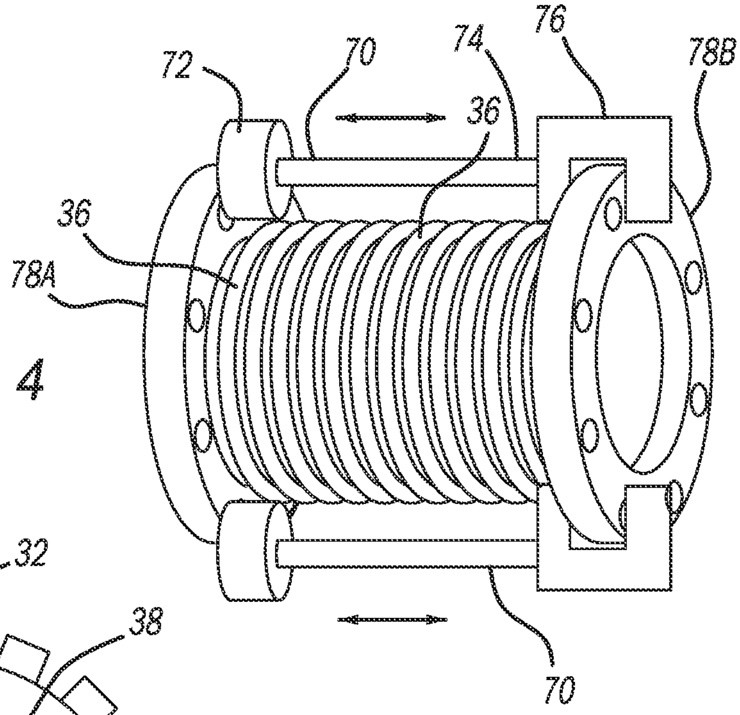
FIG. 4 is a perspective view of another expansion joint of the conduit of FIG. 1 including exemplary acoustic wave generators in the form of acoustic shakers.

With reference to FIG. 4, the acoustic wave generators 50 may include acoustic shakers 70. Each acoustic shaker 70 includes a base 72, a rod 74 extending from the base 72, and a clamp 76 at a distal end of the rod 74. The base 72 may be arranged at a first flange 78A of the expansion joint 36. The clamp 76 may be positioned to clamp onto an opposite flange 78B of the expansion joint 36. Actuation of the rod 74 agitates the expansion joint 36 to incorporate acoustic agitation into the conduit 30 and reduce the viscosity of the non-Newtonian material.

Figure 5A:
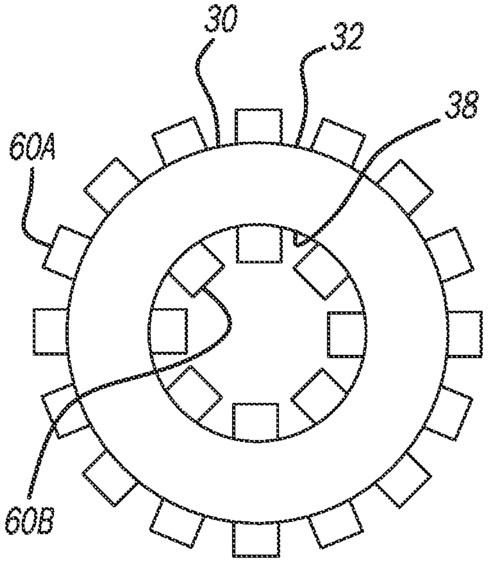
FIG. 5A is a cross-sectional view of the conduit including exemplary acoustic wave generators in the form of external acoustic transducers aligned with internal acoustic transducers.
Figure 5B:
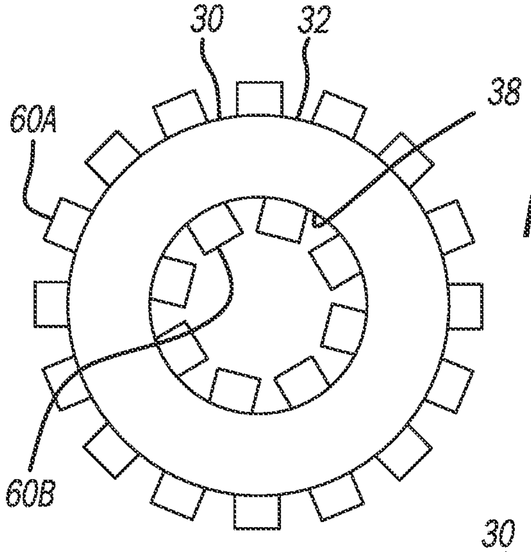
FIG. 5B is a cross-sectional view of the conduit including external acoustic transducers offset from internal acoustic transducers.

With reference to FIGS. 5A and 5B, the conduit 30 may include one or more concentric pipes including an inner ring 38 opposite to exterior surface 32. The non-Newtonian fluid flows in an area of the conduit 30 defined between the exterior surface 32 and the inner ring 38. In this configuration, the acoustic wave generator 50 is in the form of external acoustic transducers 60A at the exterior surface 32 and internal acoustic transducers 60B at the inner ring 38. In the configuration of FIG. 5A, the external transducers 60A are arranged opposite to the internal transducers 60B. The transducers 60A, 60B are configured to fire in any suitable sequence to generate rotational flow of the non-Newtonian fluid through the conduit 30. For example, the external transducers 60A may be fired sequentially in a clockwise direction, and the internal transducers 60B may be fired sequentially in a counter-clockwise direction to generate rotational flow of the non-Newtonian material. With reference to FIG. 5B, the external transducers 60A may be arranged offset from the internal transducers 60B. In this configuration, both the external transducers 60A and the internal transducers 60B may be fired sequentially in a clockwise or counterclockwise direction to generate rotational flow of the non-Newtonian material through the concentric conduit 30.

Figure 6:
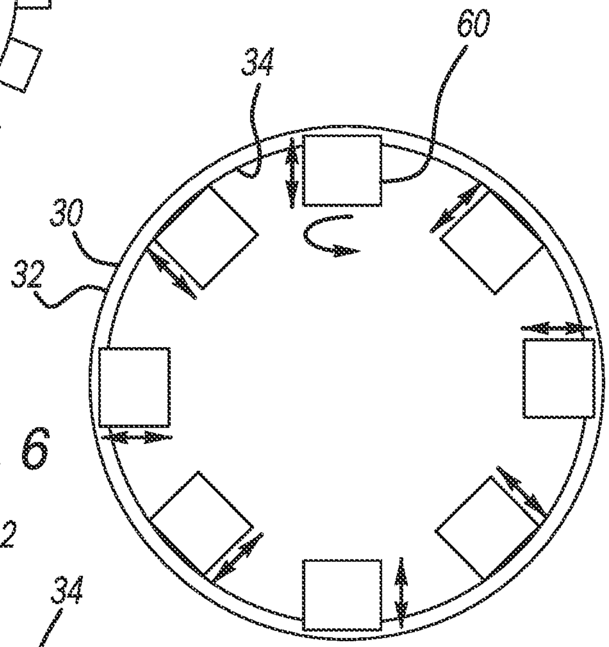
FIG. 6 is a cross-sectional view of the conduit including exemplary acoustic wave generators in the form of internal acoustic transducers configured to generate translatory and rotary motion.

With reference to FIG. 6, the acoustic wave generators 50 may be configured as acoustic transducers 60 mounted to the inner surface 34 of the conduit 30. The acoustic transducers 60 are configured as rotary and/or translatory transducers for mechanically agitating the non-Newtonian fluid by way of rotary and translatory motion.

Figure 7:
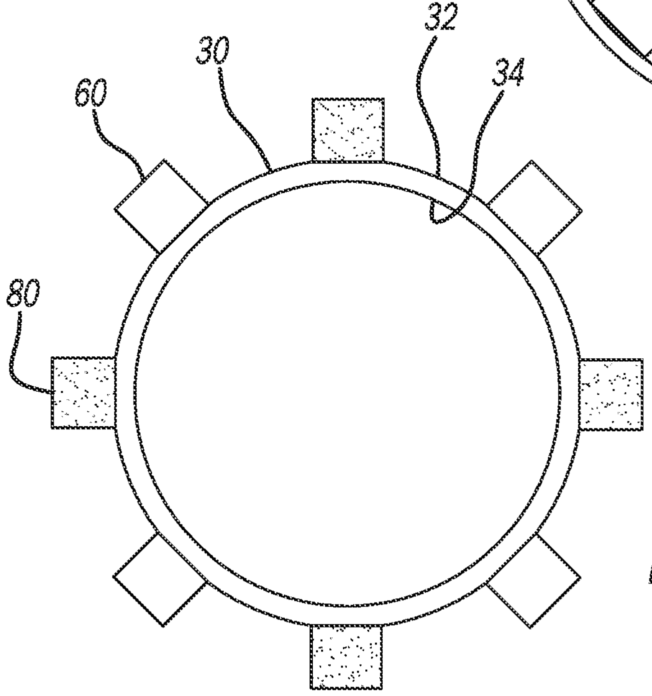
FIG. 7 is a cross-sectional view of the conduit including exemplary acoustic wave generators in the form of external acoustic transducers with heaters therebetween.

With reference to FIG. 7, the acoustic wave generators 50 may include the acoustic transducers 60 spaced apart about the exterior surface 32 of the conduit 30. Between the acoustic transducers 60 are any suitable heaters 80 configured to heat the non-Newtonian fluid. The heaters 80 may be arranged at the exterior surface 32, or at any other suitable location. Both acoustically agitating and heating the non-Newtonian material simultaneously further reduces the viscosity of the non-Newtonian material.

Figure 8:
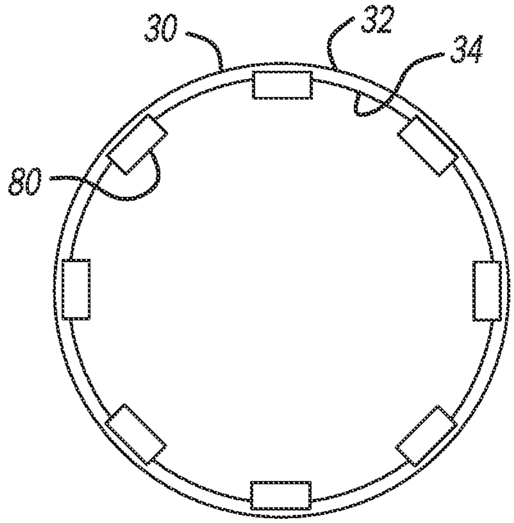
FIG. 8 is a cross-sectional view of the conduit including exemplary acoustic wave generators in the form of internal piezoelectric patch transducers.

With reference to FIG. 8, the acoustic wave generators 50 may be configured as internal piezoelectric patch transducers 80 at the interior surface 34 of the conduit 30. When activated, the transducers 80 ultrasonically agitate the non-Newtonian fluid flowing through the conduit 30 to decrease the viscosity thereof.

Figure 9:
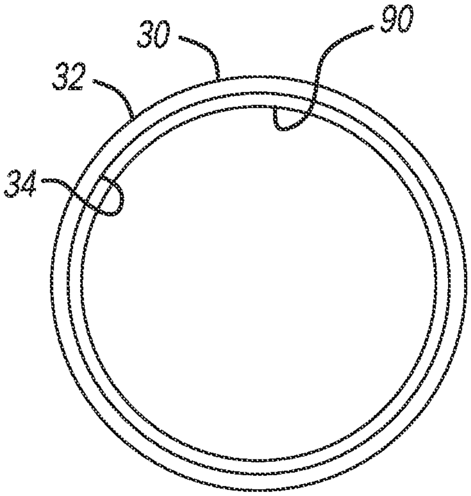
FIG. 9 is a cross-sectional view of the conduit including an exemplary acoustic wave generator in the form of an internal piezoelectric film actuator.

FIG. 9 illustrates another exemplary acoustic wave generator 50 in the form of an internal piezoelectric coating actuator, such as a film 90, which is configured to ultrasonically agitate the non-Newtonian material when a voltage is applied to the film 90. The ultrasonic agitation reduces the viscosity of the non-Newtonian material.

Figure 10:
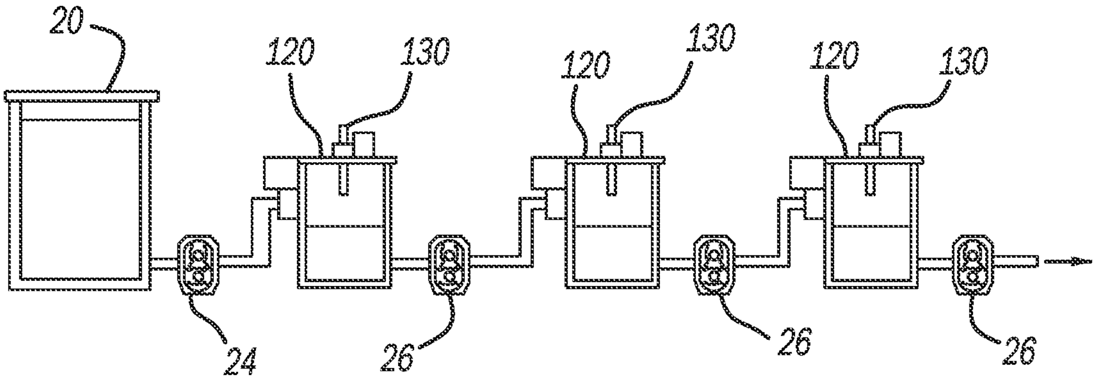
FIG. 10 illustrates exemplary pumps and transfer stations for inclusion with the system of FIG. 1.

With reference to FIG. 10, to facilitate transport of the non-Newtonian fluid across a large distance, the system 10 may further include intermediate transfer stations 120 between the storage container 20 and the dispensing system 22. Any suitable number of transfer stations 120 may be included, such as three in the example illustrated. In the example of FIG. 10, the main pump 24 pumps the non-Newtonian material from the storage container 20 to a first transfer station 120. From the first transfer station 120, a transfer pump 26 pumps the non-Newtonian fluid to a second transfer station 120. Additional transfer pumps 26 pump the non-Newtonian material to the dispensing system 22. The transfer pumps 26 reduce the overall load on the main pump 24, which increases the overall distance that the non-Newtonian fluid may be transported. Each one of the transfer stations 120 includes any suitable pressure source 130. The pressure source 130 is configured to apply pressure to the non-Newtonian material at the transfer stations 120 to facilitate pumping of the non-Newtonian material out of the transfer stations 120. The pressure source 130 may include, for example, a plunger configured to press against the non-Newtonian fluid.

The system 10 thus advantageously includes acoustic wave generators 50 that impart acoustical shear agitation on non-Newtonian materials flowing through the conduit 30, which reduces the viscosity of the non-Newtonian materials, thereby allowing the materials to be transported over large distances without the materials clogging the conduit 30, and without imparting excessive stress on the pump 24.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A system for transporting a non-Newtonian material, the system comprising:

a storage container configured to store the non-Newtonian material;

a dispensing system configured to dispense the non-Newtonian material;

a conduit connecting the storage container to the dispensing system, the conduit configured to transport the non-Newtonian material from the storage container to the dispensing system;

a pump configured to pump the non-Newtonian material out of the storage container and through the conduit to the dispensing system;

a hanger configured to support the conduit from a support structure; and an acoustic wave generator along the conduit configured to impart acoustical shear agitation to the non-Newtonian material to reduce viscosity of the non-Newtonian material;

wherein:

the acoustic wave generator includes a plurality of acoustic transducers arranged around the conduit; and the plurality of acoustic transducers are on an interior of the conduit.

2. The system of claim 1, wherein the plurality of acoustic transducers include shear polarized acoustic transducers configured to introduce shear acoustic waves in a direction parallel to a longitudinal axis of the conduit.

3. The system of claim 1, wherein the plurality of acoustic transducers include rotary transducers and translatory transducers.

4. The system of claim 1, wherein the plurality of acoustic transducers are at an expansion joint of the conduit.

5. The system of claim 1, wherein:

the conduit includes a concentric pipe; and the acoustic wave generator includes outer acoustic transducers at an outer diameter of the concentric pipe.

6. The system of claim 5, wherein the outer acoustic transducers are aligned with the plurality of acoustic transducers on the interior of the conduit.

7. The system of claim 5, wherein the outer acoustic transducers are offset from the plurality of acoustic transducers on the interior of the conduit.

8. The system of claim 1, further comprising a heater proximate to the acoustic wave generator, the heater configured to heat the non-Newtonian material.

9. The system of claim 1, wherein the acoustic wave generator includes a plurality of internal piezoelectric patch transducers at an interior of the conduit.

10. The system of claim 1, wherein the acoustic wave generator includes a piezoelectric film transducer at an interior of the conduit.

11. The system of claim 1, wherein the hanger is configured to support the conduit from the support structure including a building truss.

12. The system of claim 1, wherein the hanger includes dampeners configured to isolate vibration of the conduit from the support structure.

13. A system for transporting a non-Newtonian material, the system comprising:

a storage container configured to store the non-Newtonian material;

a dispensing system configured to dispense the non-Newtonian material;

a conduit connecting the storage container to the dispensing system, the conduit configured to transport the non-Newtonian material from the storage container to the dispensing system;

a transfer chamber along the conduit between the storage container and the dispensing system;

a first pump configured to pump the non-Newtonian material out of the storage container and into the transfer chamber;

a second pump configured to pump the non-Newtonian material out of the transfer chamber to the dispensing system;

a pressure source at the transfer chamber configured to apply pressure to the non-Newtonian material within the transfer chamber; and a plurality of acoustic transducers along the conduit configured to impart acoustical shear agitation to the non-Newtonian material to reduce viscosity of the non-Newtonian material.

14. The system of claim 13, wherein the plurality of acoustic transducers include shear polarized acoustic transducers configured to introduce shear acoustic waves in a direction parallel to a longitudinal axis of the conduit.

15. A system for transporting a non-Newtonian material, the system comprising:

a storage container configured to store the non-Newtonian material;

a dispensing system configured to dispense the non-Newtonian material;

a conduit connecting the storage container to the dispensing system, the conduit configured to transport the non-Newtonian material from the storage container to the dispensing system;

a pump configured to pump the non-Newtonian material out of the storage container and through the conduit to the dispensing system; and a plurality of shear polarized acoustic transducers about the conduit configured to introduce shear acoustic waves in a direction parallel to a longitudinal axis of the conduit to reduce viscosity of the non-Newtonian material, wherein the plurality of shear polarized acoustic transducers are on an interior of the conduit.

* * * * *